United States Patent [19]

Tingskog

[11] Patent Number: 5,027,943
[45] Date of Patent: Jul. 2, 1991

[54] BELT CONVEYOR

[75] Inventor: Lennart Tingskog, Kattegattsgatan, S-253 71 Helsingborg, Sweden

[73] Assignee: Lennart Tingskog, Helsingborg, Sweden

[21] Appl. No.: 460,871

[22] PCT Filed: Jun. 23, 1988

[86] PCT No.: PCT/SE88/00352
§ 371 Date: Feb. 7, 1990
§ 102(e) Date: Feb. 7, 1990

[87] PCT Pub. No.: WO89/01451
PCT Pub. Date: Feb. 23, 1989

[30] Foreign Application Priority Data

Aug. 7, 1987 [SE] Sweden ................................ 8703075
Apr. 13, 1988 [SE] Sweden ................................ 8801351

[51] Int. Cl.⁵ .......................................... B65G 15/08
[52] U.S. Cl. .................................... 198/819; 198/833
[58] Field of Search ............... 198/819, 821, 824, 825, 198/826, 830, 833, 818

[56] References Cited

U.S. PATENT DOCUMENTS 826,312  7/1906  Catlin ................................... 198/818
3,164,238  1/1965  McCullagh ........................ 198/819

FOREIGN PATENT DOCUMENTS 529811  7/1954  Belgium ............................. 198/830
532636  11/1954  Belgium ............................. 198/821
1447642  12/1988  U.S.S.R. ............................. 198/819

Primary Examiner—Joseph E. Valenza

[57] ABSTRACT

A belt conveyor comprises an endless conveyor belt (5) which has a bottom portion (6) provided on its underside with a central bead (7). The underside of the bead is formed with a groove (10) for receiving a carrying cable (11) at least along the major part of the goods conveying reach of the conveyor. The belt conveyor also comprises a plurality of pulleys (12) arranged below the carrying cable and adapted to directly support the carrying cable and further guide rollers (14, 15) arranged at least along the goods conveying reach and engaging the lateral surfaces of the bead (7). The width and the depth of the groove are such that the guide rollers are capable of transmitting lateral forces to the carrying cable (11). Moreover, the guide rollers make such contact with the lateral surfaces of the bead that the bead is substantially immobile in a vertical direction. Finally, the belt conveyor is provided with a guide (18, 19) along the goods conveying reach, which engage with the belt to prevent it from tipping from the carrying cable. This design makes it possible to drive the belt at high speed and through sharp curves.

15 Claims, 5 Drawing Sheets

5,027,943

BELT CONVEYOR

FIELD OF THE INVENTION

The present invention generally relates to a belt conveyor and specifically to one having high transport capacity and capable of operating under rough service conditions for conveying such materials as coal, ore, and chemicals.

More precisely, the invention relates to a belt conveyor comprising an endless belt which has a bottom portion provided on its underside with a central bead, the underside of which is formed with a groove for receiving a carrying cable at least along the major part of the goods conveying reach of the conveyor, and a plurality of pulleys arranged below the carrying cable and adapted to directly support the carrying cable.

A first object of the present invention is to improve the guiding of the belt, at the same time as the costs for manufacture, assembly, operation and maintenance of the belt conveyor are kept low. Such improved guiding makes it possible to drive the belt both at high speed and safely through curves.

This object is achieved in that the belt conveyor according to the invention is characterised by guide rollers arranged at least along the goods conveying reach and engaging the lateral surfaces of the bead, the width and depth of the groove being such that the guide rollers are capable of transmitting lateral forces to the cable, and the guide rollers making such contact with the lateral surfaces of the bead that the bead is substantially immobile in a vertical direction, and guide means arranged along the goods conveying reach and engaging with the belt to prevent it from tipping from the carrying cable.

In the belt conveyor according to the invention, the belt can thus be said to balance on the carrying cable which takes up the entire or substantially the entire weight of the conveyor belt and the goods conveyed therein. As a result, the bead can be manufactured without any special reinforcement means, which reduces the production cost, and the pulleys along the straight sections of the belt conveyor can be widely spaced apart, which brings a further reduction of the cost.

If the diameter of the carrying cable is made, for example, substantially equal to the width of the groove and smaller than the depth of the groove, the guide rollers arranged along the goods conveying reach and engaging the lateral surfaces of the bead can keep the bead correctly positioned in both the vertical and the horizontal direction relative to the carrying cable. The guide rollers can also be used to provide higher friction between the carrying cable and the bead, if required, for example when conveying goods at steep angles, and also to absorb the lateral forces that arise when the conveyor belt passes through a curve.

The inventive design of the guide rollers and the lateral surfaces of the bead, combined with the bracing action of the guide rollers on the bead in the lateral direction transversely of the travelling direction of the belt, prevents the belt from running off the carrying cable.

To obtain optimal power transmission from the guide rollers to the carrying cable, the center plane of the guide rollers is preferably coincident with the center line of the carrying cable. Furthermore, the lateral surfaces of the bead may conveniently have projecting portions for engagement with the guide rollers.

Since the groove in the bead has substantially the same width as the diameter of the carrying cable, the conveyor belt and the carrying cable can be conducted along separate paths, where this is required. This is especially suitable at the turning points of the belt conveyor, where terminal deflecting pulleys can thus be arranged for the carrying cable, together with separate terminal belt deflecting rollers disposed outside the terminal deflecting pulleys.

The possibility of removing the carrying cable from the bead is also particularly convenient at intermediate driving stations at which the carrying cable is conducted, along a given distance, in a path deviating from the path of the belt. The carrying cable which thus also serves as the driving cable, can have any length, which of course also applies to the belt.

The cross-sectional shape of the belt can be varied in many ways, the essential thing being that substantially the entire weight of the conveyor belt and the goods conveyed therein is taken up by the carrying cable.

A second object of the invention is to provide a belt conveyor of the type described above, the belt of which is closable along the entire length of the belt and can be emptied at any point along the goods conveying reach and also is of small width.

According to one embodiment, the belt therefore is a substantially U-shaped belt having two substantially planar side portions which are connected with the bottom portion and are rigid relative to the longitudinal axis of the conveyor belt, the "antitipping" means engaging with the outside of each side portion to keep it in a substantially vertical position. The conveyor belt can conveniently be conducted in a lower return run along the goods conveying reach.

The possibility of separating the carrying cable from the conveyor belt further means that the U-shaped belt can be readily turned at the ends of the return run, such that the belt along the major part of its length is supported by the carrying cable, which is the case irrespective of the position of the return path relative to the goods conveying reach.

According to a second embodiment, the belt comprises instead a flexible bottom portion as well as flexible side portions. The side portions are provided with a flange at their upper edge, such that they can be kept in a substantially vertical position by the guide means which are adapted to the flanges, whereby the guide means will be load-carrying to a certain extent.

The belt driving power is not applied directly to the belt proper, but to the carrying cable which may have a very high tensile strength. The belt driving power is preferably transmitted via driving pulleys which cooperate with the carrying cable and are arranged at a plurality of locations along the belt conveyor and which may comprise the cable-carrying pulleys and cable deflecting pulleys.

The fact that the carrying cable is driven, is of special interest in connection with long conveying reaches, since in such case a suitable number of intermediate driving stations can be arranged at which the carrying cable, by being removable from the groove of the bead, can temporarily be deflected from the unbroken path of the belt and be laid around one or more driving pulleys and again be placed in the groove of the bead after the driving station. Support rollers or the like can be arranged under the belt along the path where the belt and the conveyed goods, if any, are not supported by the carrying cable.

The belt conveyor according to the invention thus brings several advantages and has new functional properties. Among them, especially the following can be mentioned:

that the conveyor belt need not be reinforced, or but slightly reinforced, in the bead since the pulling power for conveying the belt is taken up by the carrying cable, that only one carrying cable is required, since the bead is positively guided in both the vertical and the lateral direction by the guide rollers engaging the bead, that the carrying cable which is removable from the bead, facilitates turning of the belt such that the belt along the major part of its reach can be supported by the cable, which also means that the clean side of the belt is turned downwards along the major part of the belt conveyor reach, that the belt conveyor elements subjected to forces and abrasion are in the form of an inexpensive standard type cable which can be removed from the bead and therefore easily exchanged, that the exact positioning of the bead afforded by the guide rollers makes it possible to drive the belt at higher speed, i.e. to reduce the dimensions of the belt conveyor and its need for space, and to run the belt conveyor safely through sharp curves, thus eliminating in many cases the need for costly reloadings and for superelevation of curves to prevent the belt from running off the carrying cable in the curves, and that the possibility of convenient intermediate driving by temporary removal of the carrying cable from the bead gives a practically unlimited conveyor reach with unchanged belt and cable dimensions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DETAILED DESCRIPTION OF THE PREFERRED EMBODIMENTS

Figure 2:
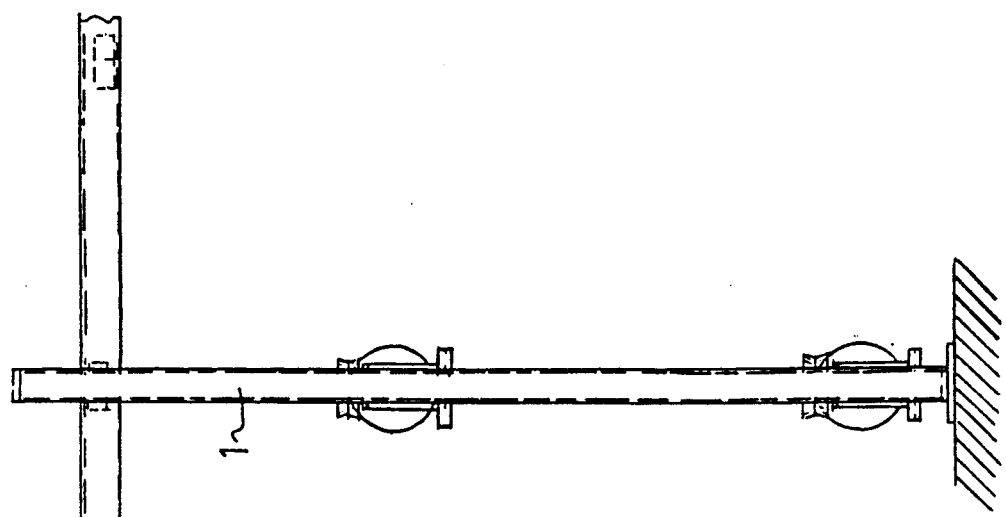
FIG. 2 is a longitudinal section of the same embodiment in which the belt and the carrying cable have been removed.
Figure 1:
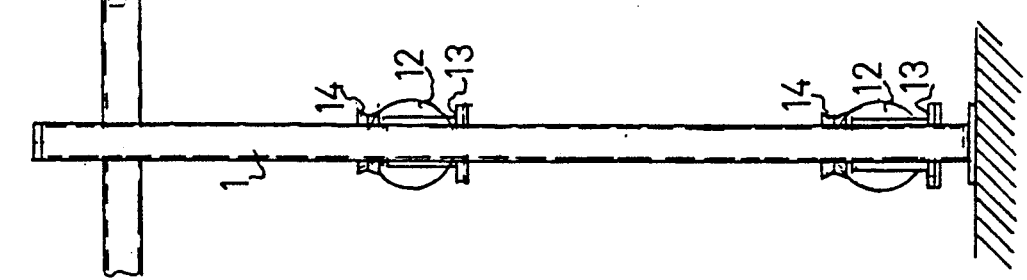
FIG. 1 is a cross-sectional view of a first embodiment of a belt conveyor according to the present invention.
Figure 1:
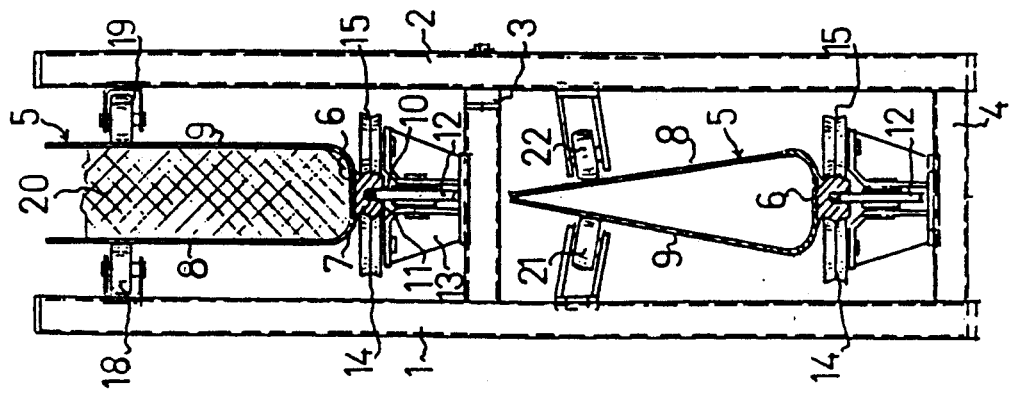

In the belt conveyor embodiment shown in FIGS. 1 and 2, a plurality of roller and pulley stands are mounted in a framework of columns 1, 2 and cross members 3, 4. Through the upper part of the framework, a conveyor belt 5 moves along a goods conveying reach, and through the lower part of the framework, the same conveying belt 5 moves in a return run. The conveying belt 5 thus is endless and substantially U-shaped in cross-section. More precisely, it comprises a bottom portion 6 which is provided on its underside with a longitudinal bead 7. Two substantially vertically extending side portions 8 and 9 are connected with the bottom portion 6. The side portions 8, 9 are articulated with the bottom portion 6 and are made of a rubber material in one piece with the bottom portion. The side portions are further provided with inserts which make them rigid relative to the longitudinal axis of the conveyor belt.

Figure 3:
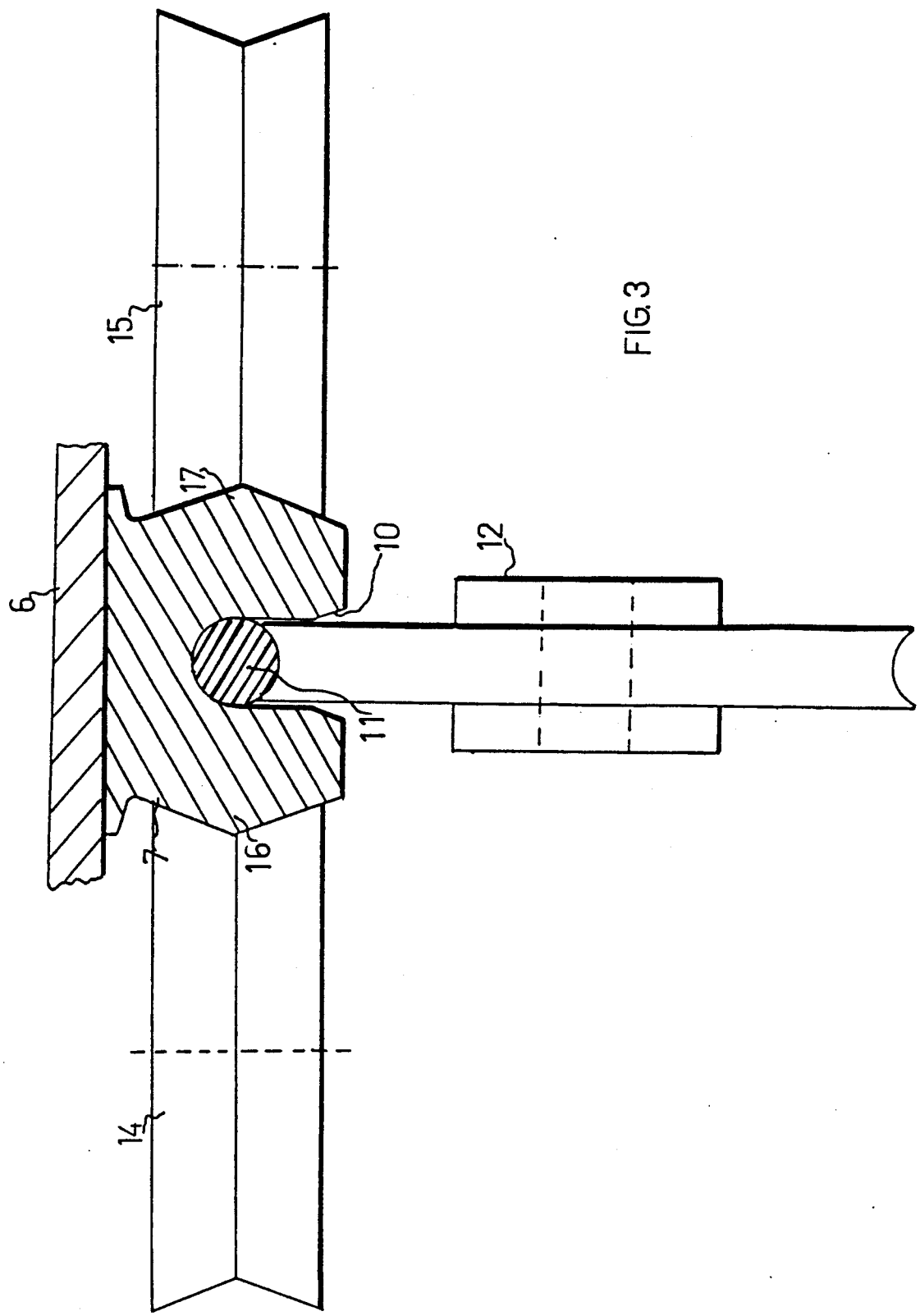
FIG. 3 is a detailed view of the bead, the carrying cable, the guide rollers and the pulley.

The bead 7 which is shown in detail in FIG. 3, has a groove 10 in its underside, and a carrying cable 11 is received in the groove. The width of the groove 10 is approximately the same as the diameter of the carrying cable 11, but the cable diameter is smaller than the depth of the groove 10. The carrying cable 11 is supported on a pulley 12 which is rotatably mounted in a roller stand 13 attached to the cross member 3 and also supports two guide rollers 14 and 15. The guide rollers are rotated about vertical axes and engage the lateral surfaces of the bead 7 such that the bead 7 is immobile in the vertical direction.

As appears from the enlarged cross-sectional view in FIG. 3 showing the bead 7, the carrying cable 11, the pulley 12 and the guide rollers 14, 15, the lateral surfaces of the bead 7 have, more precisely, projecting portions 16, 17, and the circumference of the guide rollers 14, 15 has a profile matching the profile of the projecting portions 16, 17. The radius of the guide rollers 14, 15 is, more precisely, smallest in the center plane of the guide rollers 14, 15, which besides coincides with the center line of the carrying cable 11.

Moreover, lateral guide rollers 18 and 19 are mounted on the columns 1 and 2 and are rotated about vertical axes. The lateral guide rollers 18, 19 abut against the upper section of the outside of each side portion 8, 9 to keep the side portions in a substantially vertical position against the action of the outwardly directed pressure which the conveyed goods 20 exert upon the side portions 8, 9.

A roller stand 13 mounted on the cross member 4 under the conveyor belt 5 in the return run is essentially identical with the above-mentioned roller stand 13 and thus supports a pulley 12 and guide rollers 14 and 15. Two further roller stands are fixedly mounted on the columns 1 and 2, and lateral guide rollers 21 and 22 are rotatably mounted in these roller stands about axes which are inwardly inclined towards the center of the framework, such that the side portions 8 and 9 are engaged with each other at their upper edges.

As appears from FIG. 2, the frameworks are also connected to each other by longitudinal stay members 23 which constitute roller stands for said lateral guide rollers 18, 19 and for further lateral guide rollers 18, 19 between the frameworks. The lateral guide rollers 18, 19 are alternately arranged at different levels, which reduces the wear of the outside of the belt side portions 8, 9 at the locations where the side portions are supported by the lateral guide rollers 18, 19. As indicated by dashed lines in FIG. 2, further guide rollers 14 can be mounted on the inner side of a curve.

As shown in FIG. 3, the circumference of the pulley 12 has a profile which matches the circular cross-section of the carrying cable 11. This applies also to the bottom of the groove 10 in the bead 7.

Figure 4:
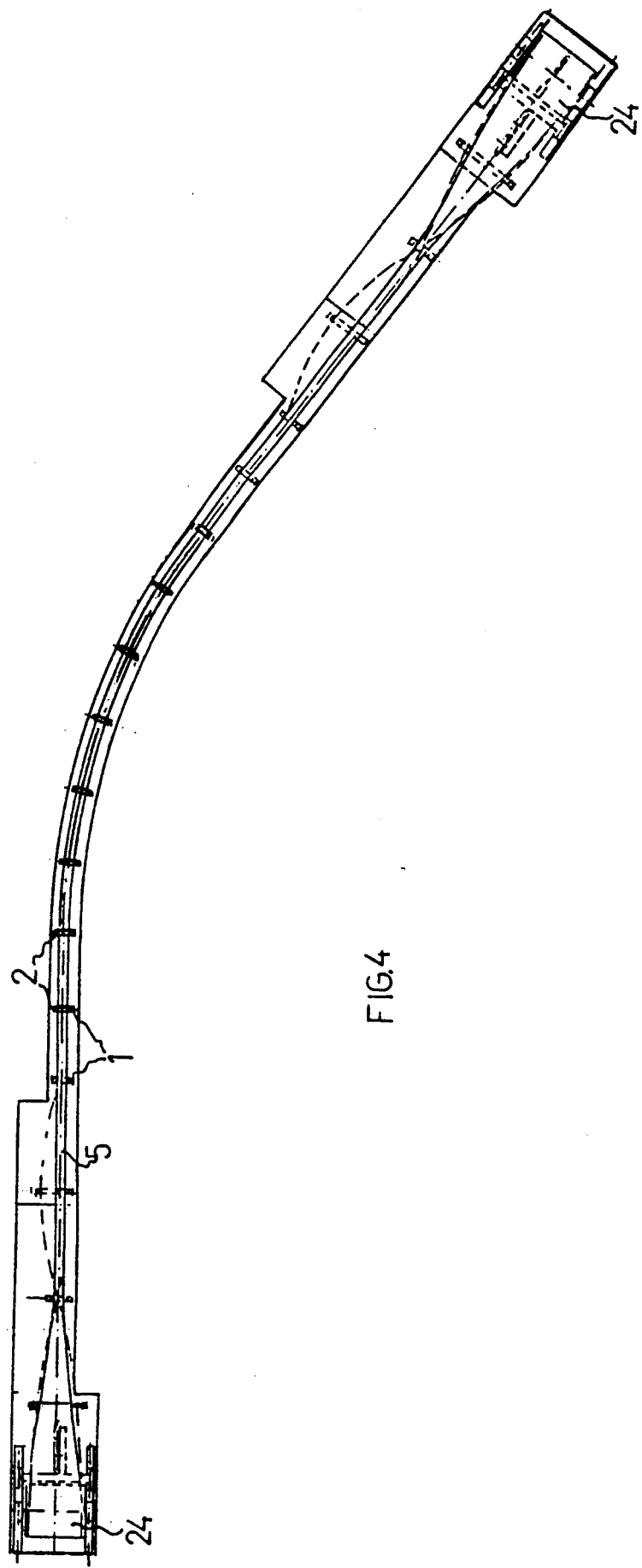
FIG. 4 is a plan view of an example of the reach of a belt conveyor.
Figure 5:
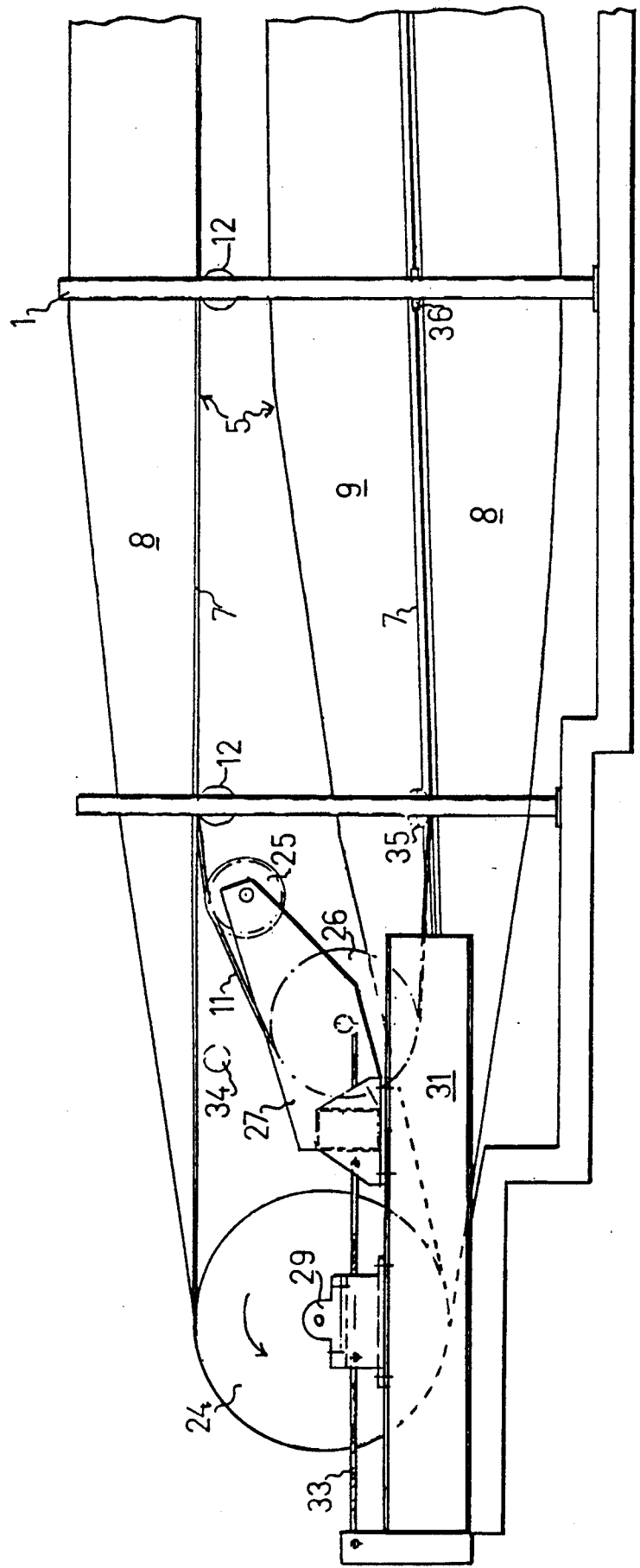
FIG. 5 is a side view on a larger scale of one end of the belt conveyor shown in FIG. 4.

The belt conveyor according to the invention as shown in FIGS. 4 and 5 has two straight runs and a curve, the radius of which can be as small as 8-15 m according to the size of the conveyor. At the end of the belt conveyor shown in FIG. 5, the side portions 8, 9 of the upper belt run are successively unfolded through 90°, until they extend in the plane of the bottom portion 6, and the belt 5 is in this state conducted around a deflecting roller 24. Before the belt 5 reaches the deflecting roller 24, the carrying cable 11 is pulled out of the groove 10 and its travelling direction changes by 180° in that it is conducted over two deflecting pulleys 25 and 26. When the belt 5 leaves the deflecting roller 24, it is turned about its own longitudinal axis, such that after turning it takes the position shown at the bottom in FIG. 1, in its return run.

Both a holder 27 for the deflecting pulleys 25, 26 and bearing housings 29 for the spindle of the deflecting roller 24 are displaceably mounted on fixed beams 31. Two screw spindles 33 are fixedly mounted along the beams 31 and extend through holes in the holder 27 and the bearing housings 29, whereby the holder and the bearing housings can be moved along the beams 31 for tensioning of the carrying cable 11 and the belt 5, respectively. FIG. 5 shows only one bearing housing 29, one beam 31 and one screw spindle 33.

To facilitate turning of the belt as described above, an additional support roller 34, additional pulleys 35, 36 and a pressure roller (not shown) co-operating with the pulley 36, are arranged in the manner shown.

For the belt conveyor shown in FIG. 5, it can be sufficient to drive the belt 5 by applying a driving torque to the carrying cable deflecting pulleys 26 at the ends of the belt conveyor. For longer conveying reaches, it is however advisable to arrange intermediate driving stations which are equidistantly spaced apart along the belt conveyor reach and adapted to transmit pulling power to the carrying cable and, to this end, use the possibility of removing the carrying cable 11 from the groove 10 of the bead 7.

Figure 6:
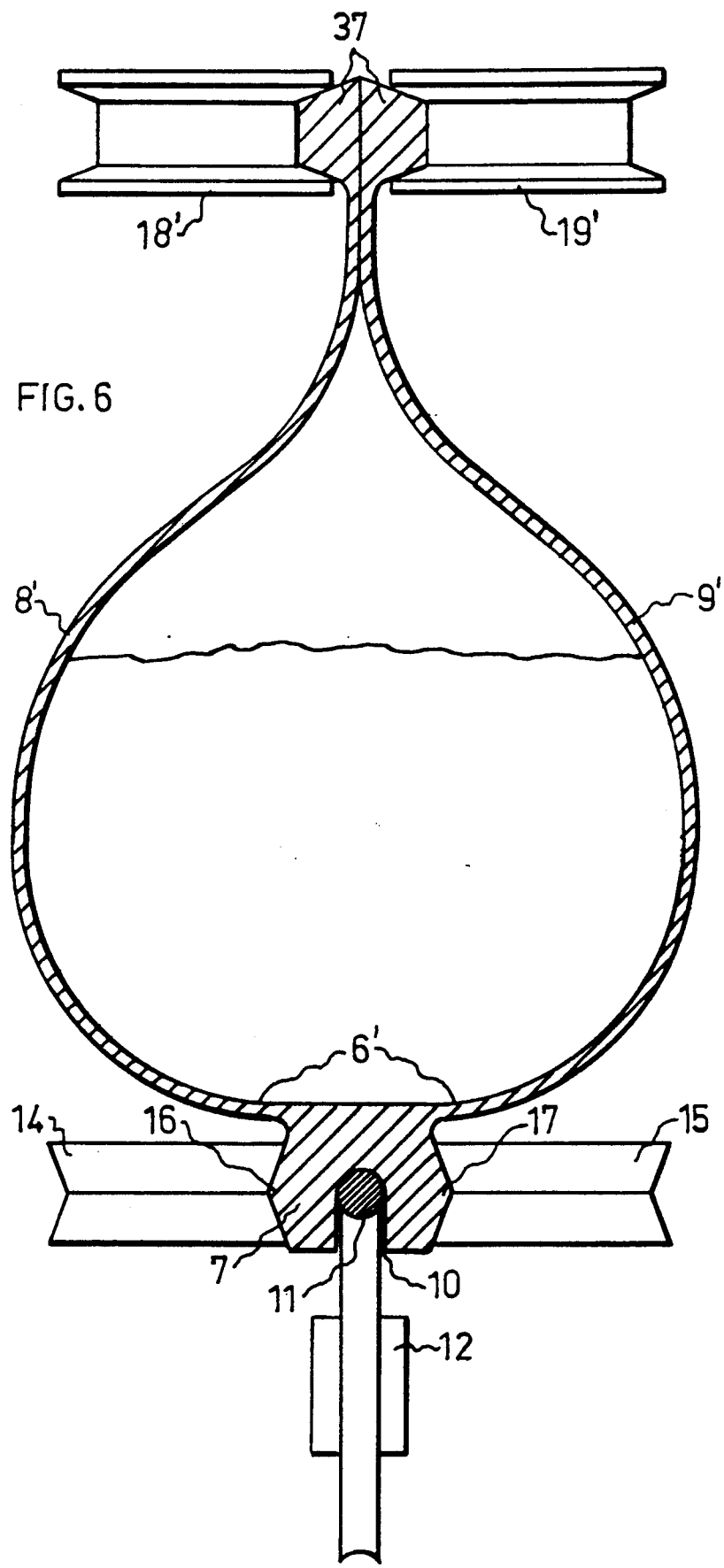
FIG. 6 is a cross-sectional view of a second embodiment of the belt in the belt conveyor according to the invention.

FIG. 6 shows a second embodiment of a conveyor belt 5' which can also be used in a belt conveyor according to the invention. The bottom portion 6' and the side portions 8', 9' of the belt 5' are in this case flexible, and the upper edges of the side portions are provided with flanges in the form of V belt-shaped reinforcement means 37. By guide means in the form of V belt pulleys 18', 19' cooperating with the reinforcement means 37, the side portions 8', 9' are kept in substantially vertical position and are brought into contact with each other. It will be appreciated that this shape of the belt allows extremely sharp curves along the belt conveyor reach.

The embodiment described above can be modified in various ways within the scope of the invention. The lateral guide rollers 18, 19 can, for example, be replaced by other guide members, such as slide bars, optionally having means for exhausting compressed air towards the side portions 8, 9. In a variant, the bead 7 can also be divided into two separate parts extending downwardly from the bottom portion 6 of the belt for engagement with the cable 11 which then abuts directly against the non-load-carrying surface of the bottom portion 6.

In the conveyor belt embodiments described above, the belt has in the working position such a shape that the entire or substantially the entire load is taken up by the carrying cable.

It should finally be emphasised that the depth of of the groove in the bead should be such that a transverse force can be applied to the cable without the cable having a tendency to climb out of the groove. While the width of the groove is always approximately equal to the diameter of the carrying cable, the depth of the groove may vary from being approximately equal to the diameter of the carrying cable, as shown by dashed lines in FIG. 2, to being several times bigger than the diameter of the cable. The essential thing is that lateral forces can be applied to the center of the carrying cable via the bead.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A belt conveyor for carrying goods over a goods conveying reach comprising:
    an endless conveyor belt generally having a U-shape configuration with a bottom portion and two substantially planar side portions which are connected with the bottom portion, the two side portions are rigid relative to a longitudinal axis of the conveyor belt, and an underside of the bottom portion of the conveyor belt being provided with a central bead having a groove defined in an underside thereof;
    a carrying cable received in the groove of the bead along at least a majority of the goods conveying reach;
    a plurality of rollers arranged below the carrying cable for directly supporting the carrying cable which supports the conveyor belt;
    guide rollers arranged at least along the goods conveying reach, said guide rollers engage lateral surfaces of the bead, width and depth of the groove of the bead being such that said guide rollers transmit lateral forces to the carrying cable in the groove, the guide rollers through contact with the lateral surfaces of the bead hold the bead substantially immobile with respect to a vertical direction; and
    guide means arranged along the goods conveying reach for engaging the outside of each side portion of the conveyor belt to maintain the side portions in a substantially vertical position.

2. The belt conveyor as claimed in claim 1, wherein a generally central plane of said guide rollers is coincident with a generally center line of the carrying cable.

3. The belt conveyor as claimed in claims 1 or 2, wherein the lateral surfaces of the bead have projecting portions which engage the guide rollers.

4. The belt conveyor as claimed in claims 1 or 2, wherein diameter of the carrying cable is substantially equal to width of said groove and approximately one of equal to and smaller than the depth of the groove.

5. The belt conveyor as claimed in claims 1 or 2, further comprising guide means for turning said belt at ends of a return run of said conveyor belt whereby said belt is supported by said carrying cable along a majority of the return run.

6. The belt conveyor as claimed in claim 5, wherein the bead is provided on the underside of the conveyor belt on both a goods conveying run and the return of the conveyor, a first one of the two side portions being located on a right-hand side of the conveyor belt during the goods conveying run and being located on a left-hand side of the conveyor belt during the return run.

7. The belt conveyor as claimed in claim 6, wherein the two side portions are inclined relative to one another during the return run, and wherein the return run is located beneath the goods conveying run.

8. A belt conveyor for carrying goods over a goods conveying reach comprising:
- an endless conveyor belt having a central bead on an underside thereof, the bead having a groove provided on an underside thereof, the belt having flexible side portions and a bottom portion, the flexible side portions are each provided with a flange at an upper side edge thereof;
- a carrying cable received in the groove of the bead along at least a majority of the goods conveying reach;
- a plurality of rollers arranged below the carrying cable for directly supporting the carrying cable which supports the conveyor belt;
- guide rollers arranged at least along the goods conveying reach, said guide rollers engage lateral surfaces of the bead, width and depth of the groove of the bead being such that said guide rollers transmit lateral forces to the carrying cable in the groove, the guide rollers through contact with the lateral surfaces of the bead hold the bead substantially immobile with respect to a vertical direction; and
- guide means arranged along the goods conveying reach for engaging the flanges of the flexible side portions of the conveyor belt, said guide means prevent tipping of the conveyor belt from the carrying cable and keep said side portions in a substantially vertical position.

9. The belt conveyor as claimed in claim 8, wherein said guide means comprises a plurality of pulleys, each pulley having a generally V-shaped groove, and wherein the flanges generally have a V-shape which mates with the V-shape groove of the pulleys.

10. The belt conveyor as claimed in claim 8, wherein a generally central plane of said guide rollers is coincident with a generally center line of the carrying cable.

11. The belt conveyor as claimed in claim 8, wherein the lateral surfaces of the bead have projecting portions which engage the guide rollers.

12. The belt conveyor as claimed in claim 8, wherein diameter of the carrying cable is substantially equal to width of said groove and approximately one of equal to and smaller than the depth of the groove.

13. The belt conveyor as claimed in claim 8, further comprising guide means for turning said belt at ends of a return run of said conveyor belt whereby said belt is supported by said carrying cable along a majority of the return run.

14. The belt conveyor as claimed in claim 13, wherein the bead is provided on the underside of the conveyor belt on both a goods conveying run and the return of the conveyor, a first one of the two side portions being located on a right-hand side of the conveyor belt during the goods conveying run and being located on a left-hand side of the conveyor belt during the return run.

15. The belt conveyor as claimed in claim 8, wherein upper inner sides of the side potions of the conveyor belt are in engagement at least where the guide means engage the flanges, the flanges being located on outer sides of the side portions of the conveyor belt.

* * * * *